United States Patent [19]

Akin

[11] 3,751,260

[45] Aug. 7, 1973

[54] PROCESS FOR TEXTURIZING MICROBIAL CELLS BY INDUCED CELL LEAKAGE

[75] Inventor: Cavit Akin, Oakbrook, Ill.

[73] Assignee: Standard Oil Company, Chicago, Ill.

[22] Filed: Jan. 20, 1971

[21] Appl. No.: 108,144

[52] U.S. Cl. .................. 99/14, 99/90 HP, 99/171 R, 195/1, 195/28 R

[51] Int. Cl. .................. A23j 3/00

[58] Field of Search .................. 195/1, 3, 3 H; 99/14, 17

[56] References Cited

UNITED STATES PATENTS

| | | | |
|---|---|---|---|
| 3,615,654 | 10/1971 | Ayukawa | 99/14 |
| 3,488,770 | 1/1970 | Atkinson | 99/17 |

*Primary Examiner*—Alvin E. Tanenholtz
*Attorney*—Philip Hill, Arthur G. Gilkes and William T. McClain

[57] ABSTRACT

Protein-containing single cell micro-organisms are prepared into texturized products by a process in which an aqueous slurry of protein-containing microbial cells is first mixed with a surface active agent to chemically promote partial leakage of inner cell components through the cell walls, after which the leaked inner cell components are separated from residual protein-containing cell debris and the residual cell debris treated first with a gelatinizing agent for a time sufficient to gelatinize the cell debris and then with a precipitating agent to induce texture formation in the gelatinized cell debris.

The texturized protein products prepared by the process are suitable for use as additives to or substitutes for natural foods and for use as bio-degradable containers, packaging materials or utensils.

15 Claims, No Drawings

PROCESS FOR TEXTURIZING MICROBIAL CELLS BY INDUCED CELL LEAKAGE

BACKGROUND OF THE INVENTION

This invention relates generally to protein-containing single cell micro-organisms, and more particularly, to a process for preparing texturized products from protein-containing single cell micro-organisms by inducing partial leakage of inner cell components from individual cells and thereby utilizing the inherent functional characteristics of cell walls to enhance texture formation.

Although a number of bio-synthetic processes have been developed for the production of protein (primarily through the growth of micro-organisms on hydrocarbon or other substrates), such protein materials have proved unsuitable for direct use in food products in large proportions. This observed unsuitability of protein-containing micro-organisms (sometimes referred to herein as single-cell protein or microbial cells) results from the inherent lack of texture which exists in such products. When placed in water, for example, a microbial cell mass becomes rapidly dispersed into a plurality of separate and isolated single cells. As a consequence, such products lack the texture, i.e., rigid or flexible coherent structure, and food-like sensation to the mouth, necessary to make them attractive for use in food products.

The established need for texturized protein-containing microbial cell products, the process of this invention, which results in the efficient formation of texturized protein products by inducing cell leakage and texturizing remaining cell debris, satisfies a need of the bio-synthetic protein art.

SUMMARY OF THE INVENTION

In brief, the process of this invention imparts highly desirable textural properties to single cell protein material, e.g., yeasts and bacteria, by:

a. chemically promoting the partial leakage of inner cell components contained in the individual cells through the cell walls and into a surrounding medium;

b. partially separating the leaked inner cell components from protein-containing residual cell debris, such as cell wall materials and remaining unleaked protein;

c. optionally treating the residual cell debris with a gelatinizing agent for a time sufficient to gelatinize the cell debris; and inducing the formation of a texturized product from the cell debris by mixing the cell debris with a precipitating agent for the cell debris.

More specifically, the leakage of inner cel components from the individual microbial cells can be promoted by mixing the cells with a surface active agent, such as sodium lauryl sulfate, hexachlorophene, a detergent or some other suitable agent capable of promoting leakage through the cell walls and membranes. The gelatinizing agent used to gelatinize the cell debris prior to texture formation typically includes alkali metal hydroxides, such as sodium hydroxide, ammonium hydroxide, ammonia, sodium carbonate and sodium bicarbonate. Finally, the gelatinized cell debris is texturized by treatment with a precipitating agent such as hydrochloric acid, phosphoric acid, acetic acid, lactic acid, $C_1$ to $C_{10}$ alcohols The texturized microbial cell products prepared by the process of this invention have the highly desirable properties of chewiness, crispness, and the ability to resits dispersion in water. This latter characteristic is particularly meaningful since the major drawback of single cell protein materials, namely, the reversion back into a plurality of individual cells when placed in water, has been reduced by the process of this invention and the products produced therefrom.

In additiona, the process of this invention permits the preparation of texturized portein products having improved textural properties which are strikingly evident when the products are shaped into fibrous or film form. In fact, the single cell protein products of this invention simulate to a remarkable extent the chewiness and texture of cooked meats and snacks, both in mouth feel and appearance. This ability to closely simulate natural food protein products is more pronounced when microbial cells are treated by the process of this invention when compared with texturized soybean or cottonseed protein materials which merely provide a textile-like texture of molecular fibers only. Texturization of leaked cells, moreover, greatly improves the ability of the single cell materials to be fomred into films and fibers.

Accordingly, the practice of this invention results in the preparation of single cell protein products having the unique physical properties required to render such products useful as additives to or substitutes for natural foods, in addition, the porducts so obtained are both edible and biodegradable.

DESCRIPTION OF THE PREFERRED EMBODIMENTS

The process of this invention is designed to impart textural characteristics and properties to protein containing micro-organisms grown by known commercial fermentation processes. It would be noted in this regard that the terms "texture" or "texturized," as used herein, refer to a rigid or flexible coherent mass of indi-vidual cells that can be readily formed into various sizes, shapes, and configurations and that are non-dispersible in water.

Similarly, the term "shaping," as used herein, refers to and includes any physical operation, such as slicing, chopping, extruding, pressing, molding, or the like, which causes a plurality of microbial cells to conform to a particular configuration.

The term "chewiness" refers to a particular physical state of the texturized protein products of this invention which causes such products, when chewed in the mouth, to have the physical properties of resilience, elasticity, and resistance to shear.

The term "gelatinization" refers to the development of a gel-like physical state.

In various embodiments of this invention, the cell harvest from a commercial fermentor, as for example, the crude, moisture-containing product cake recovered from a centrifuge or filter, serves as a suitable starting material for the texturization process.

It should be understood, however, that any living microbial cell materials can be treated according to the process of this invention. In a fully integrated, continuous system, for example, the microbial cells are conveniently grown in a first fermentation stage where oxygen and a suitable substrate, such as liquid or gaseous hydrocarbons or carbohydrates, together with a nutrient solution containing vitamins and minerals, are fed to a stirred reactor containing micro-organisms. The growth rate of micro-organisms on the hydrocarbon or other substrate is typically exponential. As the microorganism concentration in creases, a portion of the reaction mixture is withdrawn from the stirred reactor and the micro-organisms separated from the withdrawn reaction mixture. Included among the various processes suitable for preparing starting materials used in the practice 0 of this invention are the processes described in U.S. Pat. Nos. 3,384,491; 3,271,266; and 3,268,413 which are incorporated herein for the purpose of illustrating suitable methods for preparing starting materials for the practice of this invention.

By way of illustration, bacteria, such as those listed in Table I, yeasts, such as those listed in Table II, and fungi, such as those listed in Table III, are suitable micro-organisms for use as starting materials.

TABLE I — Suitable Bacteria

Acetobacter sp.
Arthrobacter sp.
*Bacillus subtilus*
Corynebacteria sp.
Micrococcus sp.
Pseudomonas sp.

TABLE II — Suitable Yeasts

*Candida curvata*
*Candida lipolytica*
Candida parapsilosis
Candida pulcherima
Candida utilis
*Hansenula anomala*
Hansenula wickerhamii
*Oidium lactis*
Pichia pastoris
Pichia haployhyla
Saccharomyces carlsbergensis
Saccharomyces fragilis
*Trichosporon cutaneum*
*Saccharomyces cerevisiae*

TABLE III — Suitable Fungi

*A. niger*
*A. glaucus*
*A oryzae*
A. terreus
A. itaconicus
*P. notatum*
P. chrysogenum
P. glaucum
P. griseofulvum The use of *Candida utilis, Saccharomyces cerevisiae, Saccharomyces fragilis*, and *Saccharomyces carlesbergensis* are preferred starting materials for the process of this invention, however, because each is F.D.A. approved for use in food products.

In each of the embodiments of this invention, the single cells ar typically in the form of an aqueous slurry or paste prior to treatment, the aqueous slurry of single cell protein materials obtained from fermentation, for example, normally has a cell concentration in the range of about 0.5 to 4 percent by weight cells based on the total weight of the slurry. Accordingly, it is desirable to concentrate the aqueous slurry or paste prior to undertaking the other steps involved in the texturization process. Concentration can normally be accomplished by means such as centrifuging, drying, and the like, for a time sufficient to obtain the desired cell concentration.

It has been found that cell concentrations in the range of about 5 to 30 percent by weight cells based on the total weight of the cell slurry or paste are desirable for use in the process of this invention. Preferably, however, cell concentrations in the range of 10 to 15 percent by weight cells based on total weight of the cell slurry or paste are especially desired because such slurries or pastes have excellent flow characteristics during the treatment proces.

Turning now to the various embodiments of this invention, it should be noted that the process of this invention concerns in part the recognition that protein-containing single cell micro-organisms can be imparted with texture and, in fact, readily shaped or cast into excellent fibers or films, by chemically promoting a partial leakage of inner cell components through the cell walls and then by successively treating the residual cell debris with a gelatinizing agent and a precipitating agent.

In general, the leakage of inner cell components through the cell walls is promoted by mixing the aqueous slurry or paste of microbial cells with a surface active agent capable of damaging the cell walls or cell membranes to the extent necessary to permit a partial leakage of inner cell components through the cell walls and into the surrounding medium of water. It has been found that particularly sfitable surface active agents useful in the practice of this invention include sodium lauryl sulfate, hexachlorophene and detergents. Typicaly, about 0.01 to about 10 percent by weight surface active agent, based upon the total combined weight of surface active agent, microbial cells and surrounding medium, i.e., water, is sufficient to promote cell leakage.

When the cell slurry or paste is mixed with surface active agents and the mixture subjected to agitation, it is observed that the viscosity of the slurry or paste decreases while its elasticity increase. The viscosity decrease and elasticity increase of the cell slurry or paste indicates that the surface active agent is acting upon the individual microbial cell walls and permitting the leakage of inner cell components through the walls and into the surrounding medium.

If the agitation of the cell slurry and surface active agent mixture is terminated in a batch operation, the solid materials, such as cell walls and unleaked inner cell components, will settle, leaving a relatively clear supernatant at the top of the reaction vessel which houses the mixture. Typically, the volume of supernatnat is in the range of about 15 to 80 percent by volume of the original slurry volume. The color of the supernatant is water clear to brownish yellow, depending upon the color characteristics of the microbial cells used in the process and the amount of leakage of inner cell components. The solid cell walls and remaining protein containing unleaked portion of inner cell components is referred to herein as residual cell debris.

As previously noted, the cell debris and supernatant tend to naturally separate in a batch operation of the process of this invention. In contrast, when a continuous process is employed, the mixture of cell slurry and surface active agent is passed through a separation step when cell debris and supernatant are mechanically separated.

After separation of supernatant (or leaked inner cell components and water) and the residual cell debris, the supernatant, which contains some protein and surface active agent, is subjected to further treatment, such as precipitation, dialysis, extraction, gel filtration or evaporation, either to recover protein or convert the protein to amino acids. The residual cell debris, on the other hand, is transferred to a second reaction vessel where the cell debris is mixed with sufficient gelatinizing agent for a time sufficient to gelatinize the cell debris.

Although a number of gelatinizing agents are suitable for use in the practive of this inventionm alkaline compositions such as alkali metal hydroxides, ammonia, ammonium hydroxide, sodium carbonate, and sodium bicarbonate are typically preferred because of their ready availability and relatively low cost. Generally, sufficient gelatinizing agent is mixed with the residual cell debris to adjust the pH of the mixture to about 7.5 to 9 and to assure gelatinization of the residual cell debris.

The gelatinized cell debris is then removed from the reaction vessel and is observed to have an increased viscosity and elasticity over the ungelatinized cell debris. In fact, the gelatinized cell debris removed from the reaction can be desirably shaped in the form of thin fibers or threads which are similar in shape and appearance to meat fibers or alternatively case in the form of a film or chopped and shaped into a variety of forms and configurations. It should be understood, however, that shaping is not a necessary step in the practice of this invention and that an unshaped product can be just as easily passed through the subsequent steps of the process for ultimate texture formation.

Finally, the shaped or unshaped gelatinized cell debris, after removal from the second reaction vessel, is treated with a precipitating agent to induce the formation of a texturized product from the gelatinized cell debris. Although a number of precipitating agents can be employed to induct texture formation, the following precipitation agents have been found to be particularly effective: hydrochloric acid, phosphoric acid, acetic acid, lactic acid, $C_1$ to $C_{10}$ alcohols and mixtures thereof.

Tupicaly, texture formation is induced by merely passing the gelatinized cell debris through an aqueous bath of precipitating agent. It should be understood, however, that virtually the same result can be accomplished by applying the precipitating agent to the shaped or unshaped gelatinized cell debris by spraying, vaporization, coating, or the like, without actually passing the gelatinized cell debris through a bath.

One particularly preferred group of precipitating agents are aqueous solutions of ethanol, because of the variety of texturized products which can be prepared merely by altering the concentration of the ethanol solutions, If low concentration of ethanol, e.g., 1 to 25 percent by weight ethanol in water, is used, a texturized product in the form of a fibrous mass is prepared. On the other hand, when high concentrations of ethanol, e.g., 25 to 90 percent by weight ethanol in water, are used, films, flakes, and chunks of texturized microbial cells are obtained.

After the gelatinized cell debris has been treated with a precipitating atent, the texturized protein product obtained can be further shpaed if desired and then dried. Drying ia accomplished, for example, by passing hot air over the texturized product for a time sufficient to remove waste materials or by conventional infrared or vacuum drying techniques.

In addition to ading surface active agent and gelatinizing agent in separate steps, it is also sometimes desirable in the practice of this invention to mix the aqueous slurry or paste of microbial cells with surface active agent and gelatinizing agent simultaneously in one reaction vessel. When the slurry, surface active agent, and the gelatinizing agent are simultaneoulsy mixed in one reaction vessel rather than i two separate stages, cell leakage and gelatinization can be made to occur in one step. The reaction mixture removed from the reaction vessel is the passed through a separator when gelatinized cell debris is separated from supernatant and then shaped, if desired, and treated with a precipitating agent to induct texture formation.

All of the unique texturized products prepared by the process of the invention are characterized by being non-dispersible in water. When viewed under a microscope, for example, the texturized products of this invention have a rigid or flexible coherent structure in wich a plurality of individual cells are in a closely packed arrangement. When placed in water, the products do not revert back into single cell form but rather retain their coherent structure. In the case of fiber-shaped products, an extremely close similarlity is observed between the fibers so produced and meat fibers. Products having arious non-fiber shapes, however, are found to be equally suitable for use in a wide range of food products and food intermediates, such as high protein snack products and bakery products, and can be mixed with various food dyes and additives.

The process and products of this invention are illustrated in the following examples. All parts and percentages are by weight unless otherwise indicated.

EXAMPLE I

One-hundred gram samples of a 16 percent dry weight slurry of a butane culture of microbial cells were mixed with 0.01, 0.1, 0.5, 1, and 5 grams of sodium lauryl sulfate. The mixtures were allowed to stand at room temperature for 30 minutes after which the mixtures developed eggwhite-like consistencies at an increasing order as the sodium lauryl sulfate concentration increased. When the mixture were observed under the microscope, the cells appeared suspended in eggwhite-like medium. When acetic acid or ethanol was added to the mixture, microscopic size films and fibers of the mixture were formed.

EXAMPLE II

The microbial cell-sodium lauryl sulfate mixtures prepared by the procedures of Example I were divided into three portions and each portion was treated as follows.

The first portion of each sample was mixed well with a spatual and then spread over an aluminum dish to form 0.1 mm. to 2 mm. thick films. The films were dried in a 70° C over and were observed to be brittle after drying. The films did not disperse into single cells when soaked in water.

The second portion of each sample was mixed with an equal volume of water and centrifuged. The residues were washed twice with water. Next, the washed residues were spread over aluminum dishes to form 0.1 to 2 mm. thick films and dried at 70° C in an over. The dry films did not disperse into single cells when placed in water.

The third portion of each sample was mixed with an equal volume of 3 percent ammonia in water and allowed to stand at room temperature for 16 hours. Each mixture was gel-like at the end of this 16-like period. The gelatinized cells were mixed with water and then washed twixe. When the residue was dropped into a 10 percent ethanol solution in water, visible fibers formed. When the residue was dropped into 60 percent ethanol solutinon in water, visible flakes formed. After flake or fiber formation, the ethanol mixtures were allowed to settle. The supernatants were discarded and the residues were dried at room temperature. The dry products were observed to be fibrous or flaky. Neither the fibers nor flakes dispersed into single cells when placed in water.

EXAMPLE III

A 100-gram sample of 23 percent paste of live *Candida utilis* cells was mixed with 0.2 grams of sodium lauryl sulfate. The mixture was allowed to stand at room temperature for 2 hours, after which an eggwhite-like product was obtained. Then the mixture was allowed to stand overnight at a temperature of 30°C. After overnight storage, a precipitate of mostly yeast cells and a slightly yellow colored clear egg-white-like supernatant were obtained. Both the supernatant and the residue formed fiber-like and flaky precipitates when mixed with 10 to 60 percent ethanol, or 2 to 10 percent acetic acid solutions in water.

EXAMPLE IV

The test in Example III was repeated, except that instead of leaving the microbial cell-sodium lauryl sulfate mixture at a temperature of 3° C overnight, the mixture was centrifuged to obtain a debris composed of cells and attached leakage products and a clear eggwhite-like supernatant. The cll debris was mixed with 100 ml. of a 5 percent ammonia solution in water and allowed to stand overnight at room temperature, after which a gel-like product was obtained. A portion of the gel-like product was washed twice with equal volumes of water. Both the washed and unwashed portions of the gel-like protein-containing cell product formed films or flakes when mixed with 10 to 60 percent ethanol or 2 to 10 percent lactic acid solutions in water. The films or flakes were recovered and dried at a temperature of 70° C. in each case, the dried products did not disperse into single cells when placed in water.

EXAMPLE V 100 ml. of a 10 percent slurry (10 percent yeast in water) of fresh brewer's yeast (*Saccharomyces carlebergensis*) was mixed with 0.01 gram of hexachlorophene, after which the mixture was allowed to stand at room temperature for four hours. After the 4 hours, a slightly viscous slurry was obtained. The viscous slurry was centrifuged and the residue was washed twice with equal volumes of water. Then, the washed residue was mixed with 80 ml. of 1 percent ammonia. This mixture was then allowed sto stand at a temperature of 40° C for 2 hours. After storage for 2 hours, a gel-like mixture was obtained, This gel-like mixture was then extruded into a 10 percent ethanol solution to form 0.1 to 2 mm. diameter fibers.The fibers were recovered and dried in the form of a mat at 70° C. The dry product did not disperse into single cells when placed in water.

EXAMPLE VI

The procedure of Example V was repeated except that the gel-like product was dropped into a 40 percent ethanol solution in water. A flaky mass was obtained. The flakes were first allowed to settle at the bottom of the container holding the mixture and then the supernatant as discarded and the residue flakes dried at a temperature of 60° C. The dry product did not disperse into single cells when placed in water.

EXAMPLE VII

The procdure of Example V was repeated except that the gel-like product was dropped into a 0.5 percent solution of phosphoric acid in water. As was the case in Example VI, a flaky product was obtined.

EXAMPLE VIII

A 100 grams sample of *Candida utilis* suspension (about 15 percent dry weight was mixed with 0.2 grams of sodium lauryl sulfate and 1 ml. of concentrated ammonia. The mixture was allowed to stand at room temperature for 3 hours, after which a gel-like product was obtained. The gel-like product then was spread over an aluminum dish to form 0.1 mm. to 2 mm. thick films and covered with a 2 mm. layer of 20 percent isopropanol solution in water and dried at room temperature. The dry product was flaky but did not disperse into single cells when placed in water.

EXAMPLE IX

The prdouct obtained in Examples V, VI, VII, and VIII were in water for a week. Bacterial growth was detected within 3 to 4 days, indicating the biodegradable nature of the polycellular textured products prepared by the procedures set forth in Examples V, VI, VII, and VIII.

EXAMPLE X

The procedure set forth in Example VIII is repeated, except that *Saccharomyces fragilis* is used instead of *Candida utilis*. A textured product produced by this procedure did not disperse into single cells when placed in water.

EXAMPLE XI

The procedure set forth in Example V was repeated, except that the gel-like product prepared in Example V was extruded into a 10 percent lactic acid solution in water to form 0.1 mm. to 2 mm. diameter fibers. These fibers were then dried in a 50° C over; the dry fibers were observed to be brittle, but they did not disperse into single cells when placed in water.

EXAMPLE XII

The procedure set forth in Example V was repeated, except that baker's yeast (*Saccharomyces cerevisiae*) was used instead of brewer's yeast. The dry textured product prepared by this procedure remained intact when placed in water.

EXAMPLE XIII

The procedure set forth in Example VIII was repeated, except that 1 ml. of 2 N. NaOh solution in water was used instead of 1 ml. of concentrated ammonia. The product obtained was flaky and did not disperse into single cells when placed in water.

EXAMPLE XIV

The procedure of Example VIII was repeated, except that 1 ml. of 10% $Na_2CO_3$solution in water was used instead of 1 ml. concentrated ammonia. The gel-like product obtained was dropped into a bath which contained 20 percent isopropanol and 0.5 acetic acid. The resultant product was spongy in feel and did not disperse into single cells when placed in water.

EXAMPLE XV

The procedure of Example VIII was repeated, except that, instead of 0.2 gram of sodium lauryl sulfate, 0.2 gram of common household detergent (e.g., Tide) was used as a cell leakage inducing agent. The final dried product obtained did not disperse into single cells when placed in water.

It should be understood that various modifications and changes can be made in the preferred embodiments discussed herein without departing from the spirit and scope of this invention.

What is claimed is:

1. A process for preparing a texturized protein product from a plurality of individual protein-containing microbial cells comprising:

chemically promoting the partial leakage of inner cell components contained in said cells through cell walls and into a surrounding medium containing said cells;

separating said leaked inner cell components from residual protein-containing cell debris;

treating said residual protein-containing cell debris ' with a gelatinizing agent for a time sufficient to gelatinize said cell debris; and inducing the formation of a texturized product from said gelatinized cell debris by mixing said gelatinized cell debris with a precipitating agent for said cell debris, said precipitating agent being selected from the group consisting of hydrochloric acid, phosphoric acid, acetic acid, lactic acid, $C_1$ to $C_{10}$ alcohols, and mixtures thereof.

2. The process of claim 1 wherein the leakage of inner cell components through said cell walls is promoted by mixing said cells with a surface active agent capable of damaging said cell walls and cell membranes and allowing the leakage of inner cell components therethrough.

3. The process of claim 2 wherein said surface active agent is selected from the group consisting of sodium lauryl sulfate, hexachlorophene, and a detergent.

4. The process of claim 3 wherein about 0.01 to 10 percent by weight surface active agent, based upon the total combined weight of surface active agent, cells, and surroudning medium containing said cells, is mixed with said plurality of individual microbial cells.

5. The process of claim 1 wherein the leakage of inner cell components through said cell walls is promoted by simultaneously adding to said plurality of individual microbial cells:

a. 0.01 to 10 percent by weight of a surface active agent, based upon combined weight of surface active agent, cells and surrounding medium containing said cells; and b. an alkaline composition selected from the group consisting of alkali metal hydroxides, ammonium hydroxide, ammonia, sodium carbonate and sodoum bicarbonate, said alkaline composition being added in an amount sufficient to adjust the pH of the resultant mixtue to about 7.5 to b. 9.

6. The process of claim 1 wherein said gelatinizing agent is selected from the group consisting of alkali metal hydroxides, ammonium hydroxide, ammonia, sodium carbonate and sodium bicarbonate.

7. The process of claim 1 wherein said protein-containing microbial cells are slected from the group consisting of *Candida utilis*, *saccharomyces carlsbergensis*, *Saccharomyces cerevisiae*, and *Saccharomyces fragilis*.

8. The process of claim 1 wherein said gelatinized cell debris is subjected to shaping prior to formation of a texturized product from said gelatinized cell debirs.

9. A process for imparting texture to a plurality of individual protein-containing cells comprising:

preparing an aqueous slurry of individual cells having a cell cencentration of about 5 to 30 percent by weight cells based upon total combined weight of cells and water;

mixing said aqueous slurry of cells with a surface active agent for a time sufficient to promote the parital leakage of inner cell components contained in said cells through the cell walls and into the surrounding water medium;

separating said leaked inner cell components from residual protein-containing cell debirs;

treating said residual cell debirs with a gelatinizing agent for a time sufficient to gelatinize said cell debris; and treating said gelatinized cell debirs with a precipitating agent for a time sufficient to induce texture formation in said gelatinized cell debirs, said precipitating agent being selected from the group consisting of hydrochloric acid, phosphoric acid, acetic acid, lactic acid, $C_1$ to $C_{10}$ alcohols, and aqueous mixtures thereof.

10. The process of claim 9 wherein said gelatinized cell debris is shaped prior to treatment with said precipitating agent.

11. The process of claim 10 wherein said gelatinized cell debris is shaped into fiber-like threads by means of extrusion.

12. The process of claim 9 wherein said surface active agent and said gelatinizing agent are simultaneously mixed withsaid aqueous slurry of individual cells.

13. The process of claim 9 wherein said surface agent is selected from the group consisting of sodium lauryl sulfate, hexachlorophene, and a detergent, and wherein said gelatinizing agent is selected from the group consisting of alkali metal hydroxides, ammonium hydroxide, a mmonoa, sodium charbonat and sodium bicarbonate.

14. The process of claim 13 wherein the quantity of surface active agent added to said aqueous slurry of microbial cells in in the range of about 0.01 to 10 percent by weight surface active agent, based upon combined weight of surface active agent, cells and water, and wherein the quantity of ge/atinizing agent added to said risidual cell debris is sufficient to adjust the pH of the residual mixture to about 7.5 to 9.

15. The texturized product prepard by the process of claim 1.

* * * * *

PO-1050
(5/69)

UNITED STATES PATENT OFFICE
CERTIFICATE OF CORRECTION

Patent No. 3,751,260 Dated August 7, 1973

Inventor(s) Akin, Cavit

It is certified that errors appear in the above-identified patent and that said Letters Patent are hereby corrected as shown below:

Column 1, line 51, before "inducing" insert -- (d) --.

| | | |
|---|---|---|
| 2 | 4 | "resits" should be --resist--. |
| 2 | 38 | "would" should be --should--. |
| 3 | 10 | "0" after "practice" inserted erroneously. |
| 5 | 27 | "case" should be --cast--. |
| 5 | 39 | "induct" should be --induce--. |
| 6 | 16 | "induct" should be --induce--. |
| 7 | 6 | "16-like" should be --16-hour--. |
| 7 | 27 | "30°C" should be --3°C--. |
| 8 | 10 | "as" should be --was--. |
| 8 | 22 | parenthesis missing after "weight". |
| 8 | 35 | "kept" missing after "were" and before "in". |
| 10 | 3 | "to b. 9" should be --to 9--. |

Signed and sealed this 29th day of January 1974.

(SEAL)
Attest:

EDWARD M.FLETCHER,JR.
Attesting Officer

RENE D. TEGTMEYER
Acting Commissioner of Patents